United States Patent
Zhao et al.

(10) Patent No.: US 8,742,741 B2
(45) Date of Patent: Jun. 3, 2014

(54) APPARATUS AND METHODS OF SOFT-START IN A HYSTERETIC POWER CONVERTER

(75) Inventors: Bin Zhao, Irvine, CA (US); Jack Cornish, Foothill Ranch, CA (US); Victor Lee, Irvine, CA (US); Brian Horng, Irvine, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 74 days.

(21) Appl. No.: 13/216,565

(22) Filed: Aug. 24, 2011

(65) Prior Publication Data

US 2012/0249095 A1    Oct. 4, 2012

Related U.S. Application Data

(60) Provisional application No. 61/469,486, filed on Mar. 30, 2011.

(51) Int. Cl.
    *G05F 1/00* (2006.01)
(52) U.S. Cl.
    USPC .......................................................... 323/284
(58) Field of Classification Search
    USPC ......... 323/222, 234, 238, 280–284, 321, 901, 323/908, 271–274, 351; 363/49
    See application file for complete search history.

(56) References Cited

U.S. PATENT DOCUMENTS

| | | | |
|---|---|---|---|
| 6,348,780 B1 * | 2/2002 | Grant | 323/222 |
| 6,969,977 B1 | 11/2005 | Smith | |
| 7,834,608 B2 * | 11/2010 | Cheng et al. | 323/299 |
| 7,898,830 B1 * | 3/2011 | Casey et al. | 363/49 |
| 2004/0239300 A1 * | 12/2004 | Sutardja et al. | 323/283 |
| 2012/0161728 A1 * | 6/2012 | Chen et al. | 323/271 |

OTHER PUBLICATIONS

D. Briggs et al., Designing fast response synchronous buck regulators using the TPS5210, Texas Instruments Application Report, pp. 1-50, 1999.*

* cited by examiner

*Primary Examiner* — Timothy J Dole
*Assistant Examiner* — Carlos Rivera-Perez
(74) *Attorney, Agent, or Firm* — Brake Hughes Bellermann LLP

(57) ABSTRACT

In one general aspect, a power supply circuit can include a power stage configured to be coupled to a power source and configured to deliver an output voltage to a load circuit, and can include a comparator coupled to the power stage and configured to receive a reference voltage. The power supply circuit can also include a hysteresis control circuit configured to receive at least one of a feedback voltage or a reference voltage and configured to change a hysteresis of the comparator in response to the at least one of the feedback voltage or the reference voltage during a soft-start of the power supply circuit.

21 Claims, 5 Drawing Sheets

APPARATUS AND METHODS OF SOFT-START IN A HYSTERETIC POWER CONVERTER

RELATED APPLICATION

This application claims priority to and the benefit of U.S. Provisional Patent Application Ser. No. 61/469,486, filed on Mar. 30, 2011, entitled, "Apparatus and Methods for Soft-Start in a Hysteretic Power Converter," which is incorporated herein by reference in its entirety.

TECHNICAL FIELD

This description relates to a hysteretic power converter.

BACKGROUND

Some known power supply circuits (e.g., a direct current (DC)-to-DC converter such as a hysteretic buck converter) can be gradually activated using a soft-start process implemented using a soft-start circuit and a gradually ramped reference voltage. The power supply circuit can be gradually activated to reduce, for example, in-rush currents, voltage spikes, and so forth, that can damage the power supply circuit and/or a load circuit coupled to the power supply circuit.

Due to limitations in device technology and/or the input voltage range of error comparators included in known power supply circuits, the undesirable effects of instantaneously activating a power supply circuit (rather than using a soft-start process) may not be avoided. For example, low values of feedback voltage and/or low values of a ramped reference voltage when used with error comparators that are not configured to handle such low voltages can cause surge currents and output voltage overshoot even during a soft-start process. Although some known folded-cascode topologies that can handle low voltages can be used as error comparators, these folded-cascode topologies consume an undesirable level of power, space, and/or do not have the desired gains that are appropriate for certain high-speed applications.

In some known power supply circuits, the current/voltage spikes during a soft-start process can be close to, or even more than, the current/voltage limits of the power supply circuit and/or a load circuit coupled thereto. These relatively high currents/voltage can lead to reliability and/or malfunction issues in some applications. In some instances, output voltage overshoot can cause an under-voltage lock-out (UVLO) circuit in a load device to be erroneously triggered. Thus, a need exists for systems, methods, and apparatus to address the shortfalls of present technology and to provide other new and innovative features.

SUMMARY

In one general aspect, a power supply circuit can include a power stage configured to be coupled to a power source and configured to deliver an output voltage to a load circuit, and can include a comparator coupled to the power stage and configured to receive a reference voltage. The power supply circuit can also include a hysteresis control circuit configured to receive at least one of a feedback voltage or a reference voltage and configured to change a hysteresis of the comparator in response to the at least one of the feedback voltage or the reference voltage during a soft-start of the power supply circuit.

In another general aspect, a power supply circuit can include a reference voltage circuit configured to trigger a soft-start of a power supply circuit, and a comparator coupled to the reference voltage circuit. The power supply circuit can also include a hysteresis control circuit configured to change a hysteresis of the comparator during the soft-start of the power supply circuit.

In yet another general aspect, a method can include receiving, during a soft-start of a power supply circuit, a reference voltage at a comparator of the power supply circuit, and receiving a feedback voltage produced in response to the soft-start of the power supply circuit. The method can also include changing a hysteresis of the comparator in response to at least one of the feedback voltage or the reference voltage.

The details of one or more implementations are set forth in the accompanying drawings and the description below. Other features will be apparent from the description and drawings, and from the claims.

DETAILED DESCRIPTION

Figure 1:
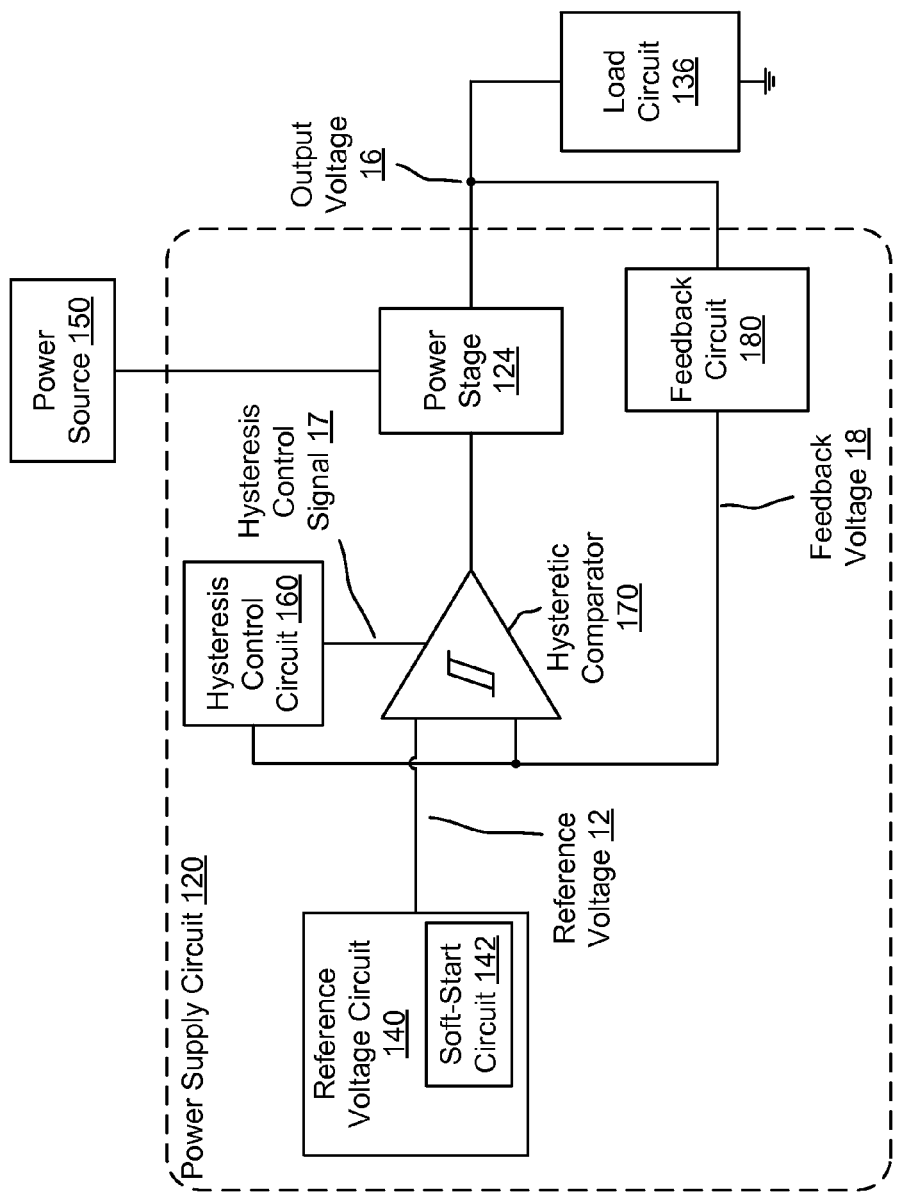
FIG. 1 is a diagram that illustrates a power supply circuit that includes a hysteresis control circuit.

FIG. 1 is a diagram that illustrates a power supply circuit 120 that includes a hysteresis control circuit 160. The power supply circuit 120 is configured to deliver power from a power source 150 to a load circuit 136. Specifically, the power supply circuit 120 is configured to manage (e.g., control, regulate) an output voltage 16 that is delivered to the load circuit 136 based on a feedback voltage 18 (associated with a feedback control loop including feedback circuit 180). In other words, the power supply circuit 120 is configured to regulate the output voltage 16 that is delivered to load circuit 136 from the power source 150.

The power supply circuit 120 shown in FIG. 1 is a hysteretic-type power supply circuit (e.g., a hysteretic power converter, a hysteretic direct-current (DC)-to-DC buck converter, a hysteretic DC-to-DC buck-boost converter, a hysteretic DC-to-DC boost converter) configured to provide voltage control (e.g., regulation) for the load circuit 136. Specifically, as a hysteretic-type power supply circuit, the power supply circuit 120 is configured to control, with a relatively fast response, the output voltage 16 within an output voltage range (which can be referred to as a hysteretic output voltage range) bounded by an upper threshold voltage and a lower threshold voltage. When the output voltage 16 falls below (or equals) the lower threshold voltage, the power supply circuit 120 is configured to provide power (e.g., provide more power) to load circuit 136. When the output voltage 16 exceeds (or equals) the upper threshold voltage, the power supply circuit 120 is configured to provide less power or interrupt power supplied to load circuit 136. Accordingly, the output voltage 16 can be maintained by the power supply circuit 120 between (or approximately between) the upper threshold voltage and lower threshold voltage of the output voltage range. In some embodiments, the upper threshold voltage and the lower threshold voltage can collectively be referred to as output threshold voltages or as voltage limits of the output voltage range.

The hysteretic control of the power supply circuit 120 is triggered, at least in part, by a hysteretic comparator 170 included in the power supply circuit 120. Specifically, the hysteretic comparator 170 is configured to trigger a power stage 124 to provide power (in a hysteretic fashion) from the power source 150 based on the feedback voltage 18 and a reference voltage 12. The feedback voltage 18 can be produced by the feedback circuit 180 based on (e.g., is derived from) the output voltage 16. In some embodiments, the feedback circuit 180 can be any type of circuit such as a voltage divider (which includes resistors), or a signal pass-through circuit (e.g., a wire) (in which case the feedback voltage 18 may be equal to (or substantially equal to) the output voltage 16).

The hysteretic comparator 170 is configured to use the feedback voltage 18, along with the reference voltage 12, to trigger the power stage 124 to provide power such that the output voltage is within the output voltage range (e.g., within the voltage limits of the output voltage range). The hysteretic comparator 170 is referred to as a hysteretic comparator because it is an error comparator that has hysteresis. In some embodiments, the hysteretic comparator 170 can be configured with a relatively fast transient response time, low power consumption, relatively small footprint (e.g., small silicon area), relatively higher gain at the same bias current, etc. (e.g., relative to a folded-cascode comparator).

In some embodiments, the output voltage range within which the power supply circuit 120 is managed can correspond with a hysteretic voltage range of the hysteretic comparator 170. For example, the hysteretic comparator 170 can have a hysteretic voltage range (with an upper threshold voltage and a lower threshold voltage) that is the same as or is proportional to a target output voltage range of the power supply circuit 120. In some embodiments, the hysteretic comparator 170 can be configured with a hysteretic voltage range that triggers control of the output voltage 16 of the power supply circuit 120 within a specified output voltage range. Thus, the output voltage 16 of the power supply circuit 120 can be maintained between an upper threshold voltage and a lower threshold voltage of an output voltage range based on an upper threshold voltage and a lower threshold voltage of a hysteretic voltage range of the hysteretic comparator 170. In some embodiments, the upper threshold voltage and the lower threshold voltage of the hysteretic voltage range can collectively be referred to as hysteretic threshold voltages or as voltage limits of the hysteretic voltage range.

The hysteresis control circuit 160 can be configured to dynamically control hysteresis of the hysteretic comparator 170 as the power supply circuit 120 is being activated (e.g., activated to an operational state) from a deactivated state (e.g., a non-operational state). For example, the hysteresis control circuit 160 can be configured to deactivate (or turn-off) hysteresis (e.g., reduce the hysteresis to zero) of the hysteretic comparator 170 as the power supply circuit 120 is being activated (e.g., started-up). In some embodiments, the hysteresis control circuit 160 can be configured to deactivate the hysteresis of the hysteretic comparator 170 until the power supply circuit 120 is in an operational state (e.g., the output voltage is within its regulated voltage range), or has reached specified conditions (e.g., voltage conditions, current conditions) during the soft-start process of the power supply circuit 120. In some embodiments, hysteresis of the hysteretic comparator 170 can be changed (e.g., controlled, modified) by changing a current through and/or a voltage across one or more branches (e.g., sides) of the hysteretic comparator 170.

Without the control of hysteresis (e.g., deactivation of hysteresis) provided by the hysteresis control circuit 160 in the soft-start process of power supply circuit 120, the output voltage 16 may not be controlled by the power supply circuit 120 in a desirable fashion. As the power supply circuit 120 is being activated (during initial startup), at least some portions of the power supply circuit 120 (e.g., the hysteretic comparator, feedback control, output filters, etc.) may not be fully activated (e.g., fully functional or operating within a desirable operating conditions (e.g., current and/or voltage)). In other words, until the power supply circuit 120 is activated or close to its operational state, at least some portions of the power supply circuit 120 may not be functioning in a desirable fashion.

For example, the hysteretic comparator 170 may not be able to operate properly at low values of the feedback voltage 18 and/or at low values of the reference voltage 12 during the initial startup of the power circuit 120, resulting in undesirable behaviors such as current surges and/or voltage spikes (e.g., overshoot) as the power supply circuit 120 is being activated. Accordingly, the dynamic control of hysteresis (e.g., increase the hysteresis value gradually in the soft-start process) by the hysteresis control circuit 160 can be performed to eliminate (or substantially reduce) undesirable behavior(s) of the power supply circuit 120 caused by the hysteretic comparator 170 during startup (at relatively low voltages) of the power supply circuit 120.

In some embodiments, after the power supply circuit 120 is in an operational state (or close to an operational state measured by reaching a threshold activation level), the hysteresis control circuit 160 can be configured to activate (or turn on) hysteresis of the hysteretic comparator 170. Specifically, when the voltages (e.g., feedback voltage 18 or reference voltage 12, rail voltages) of the hysteretic comparator 170 are at a level where the hysteretic comparator 170 can properly operate, the hysteresis control circuit 160 can be configured to activate (or turn on) hysteresis (e.g., hysteresis control) of the hysteretic comparator 170.

In some embodiments, the hysteresis control circuit 160 can be configured to change (e.g., increase, decrease) the hysteresis value of the hysteretic comparator 170 using a hysteresis control signal 17, where the hysteresis value can be a function of the voltage/current value at the hysteresis control signal 17 (analog control of the hysteresis). In some embodiments (digital control of the hysteresis), the hysteresis control circuit 160 can be configured to activate or deactivate the hysteresis of the hysteretic comparator 170 using the hysteresis control signal 17. In other words, the hysteresis of the hysteretic comparator 170 can be activated in response to the hysteresis control signal 17 being asserted (or de-asserted) and the hysteresis of the hysteretic comparator 170 can be deactivated in response to the hysteresis control signal 17 being de-asserted (or asserted). Throughout this detailed description, when a signal, such as the hysteresis control signal 17, is asserted, the signal can have a first value, and when the signal is de-asserted, the signal can have a second value. In some embodiments, the second value can be opposite the first value. For example, in some embodiments, a signal that is asserted can have a high value (e.g., a high voltage, a high binary value) and can be changed to a low value (e.g., a low voltage, a low binary value) when the signal is de-asserted.

In analog control of the hysteresis, the hysteresis control circuit 160 can be configured to control the hysteresis of the hysteretic comparator 170 by providing an analog signal, such as the hysteresis control signal 17, to the hysteretic comparator 170 where the analog signal 17 is derived from the feedback voltage 18 in hysteresis control circuit 160. In digital control of the hysteresis, the hysteresis control circuit 160 can be configured to activate (or deactivate) hysteresis of the hysteretic comparator 170 based on the feedback voltage 18 (e.g., based on the feedback voltage exceeding a threshold voltage). For example, when the feedback voltage 18 is relatively low (e.g., below a threshold voltage), the hysteresis of the hysteretic comparator 170 can be deactivated and when the feedback voltage 18 is relatively high (above a threshold voltage) the hysteresis of the hysteretic comparator 170 can be activated.

In some embodiments of digital control of the hysteresis, multiple hysteresis values can be used with multiple threshold values associated with the feedback voltage 18. In such embodiments, the hysteresis control signal 17 can be a digital signal with multiple bits or multiple lines. For example, a first hysteresis (or hysteretic voltage range) of the hysteretic comparator 170 can be triggered based on the hysteresis control signal 17 having a first digital value in response to the feedback voltage 18 exceeding a first threshold voltage. A second hysteresis (or hysteretic voltage range) of the hysteretic comparator 170 can be triggered based on the hysteresis control signal 17 having a second digital value in response to the feedback voltage 18 exceeding a second threshold voltage.

In some embodiments, activation of the hysteresis of the hysteretic comparator 170 can include increasing the hysteresis of the hysteretic comparator 170 from a low value to a higher value. For example, the hysteresis of the hysteretic comparator 170 can be increased from a low value (e.g., a zero value, 10 mV) to a high value (e.g., 30 mV, 50 mV, 200 mV).

As shown in FIG. 1, the reference voltage circuit 140 includes a soft-start circuit 142. The soft-start circuit 142 is configured to ramp-up (e.g., slowly ramp-up, monotonically ramp-up) the reference voltage 12 so that the power supply circuit 120 can be activated (e.g., gradually activated, started-up) in a controlled fashion to an operational state. In some embodiments, the reference voltage 12 during a soft-start of the power supply circuit 120 can be referred to as a soft-start reference voltage. In some embodiments, ramping-up the reference voltage 12 during initial activation of the power supply circuit 120 can be performed so that in-rush currents, noise, and/or so forth, can be avoided until the power supply circuit 120 is properly operating in an operational state at specified conditions (e.g., voltage conditions, current conditions), or is close to an operating state measured by reaching some specified conditions (e.g., voltage conditions, current conditions). In some embodiments, the soft-start circuit 142 can be separate from (e.g., not included within), but associated with, the reference voltage circuit 140.

The hysteresis control circuit 160 can be configured to function in conjunction with a soft-start managed by (e.g., implemented by, performed by, triggered by) the soft-start circuit 142. In some embodiments, the hysteresis control circuit 160 can be configured to activate hysteresis of the hysteretic comparator 170 as the reference voltage 12 is being ramped-up by the soft-start control circuit 142. Accordingly, the hysteresis of the hysteretic comparator 170 (as controlled (e.g., triggered) by the hysteresis control circuit 160) can be deactivated (or at a low value) when the soft-start of the power supply circuit 120 is initiated by the soft-start circuit 142. As the soft-start of the power supply circuit 120 proceeds, the hysteresis of the hysteretic comparator 170 can be activated (or changed to a high value).

In some embodiments, the hysteresis control circuit 160 can be configured to activate the hysteresis of the hysteretic comparator 170 when the feedback voltage 18 exceeds a threshold voltage (also can be referred to as a control threshold voltage) during soft-start of the power supply circuit 120. For example, the hysteresis control circuit 160 can be configured to increase (e.g., activate) the hysteresis of the hysteretic comparator 170 when the feedback voltage 18 exceeds a threshold voltage of a few hundred millivolts (mV) (e.g., 100 mV, 200 mV, 500 mV). Thus, a control loop of the power supply circuit 120, which includes the feedback circuit 180 with the feedback voltage 18 based on (e.g., derived from) the output voltage 16, can be used to regulate the output voltage 16 during normal operation as well as during soft-start.

In some embodiments, the hysteresis control circuit 160 can be configured to activate the hysteresis of the hysteretic comparator 170 when the reference voltage 12 (rather than the feedback voltage 18) exceeds (or meets) a threshold voltage. For example, when the reference voltage 12 (which can be a soft-start reference voltage) is relatively low (e.g., below a threshold voltage), the hysteresis of the hysteretic comparator 170 can be deactivated and when the reference voltage 12 is relatively high (above a threshold voltage) the hysteresis of the hysteretic comparator 170 can be activated. In some embodiments, the hysteresis control circuit 160 can be configured to control the hysteresis of the hysteretic comparator 170 based on a combination of the reference voltage 12 and the feedback voltage 18.

In some embodiments, the hysteresis control circuit 160 can be configured to activate hysteresis of the hysteretic comparator 170 during a soft-start managed by the soft-start circuit 142, because the soft-start managed by the soft-start circuit 142 alone may not eliminate undesirable behavior(s) of the power supply circuit 120 during startup (at relatively low voltages) of the power supply circuit 120. In some embodiments, undesirable output power behavior of the power supply circuit 120 (such as current surges and/or voltage spikes) may occur when some configurations of the hysteretic comparator 170, which may not operate in a desirable fashion at relatively low input voltages (e.g., voltages between 0 mV to 500 mV), are used in the power supply circuit 120. Deactivating the hysteresis of the hysteretic comparator 170 at these relatively low input voltages using the hysteresis control circuit 160 can eliminate (or substantially reduce) undesirable behavior of the power supply circuit during soft-start of the power supply circuit 120.

In some embodiments, changing (e.g., controlling, activating, deactivating) the hysteresis control of the power supply circuit 120 (e.g., provided by the hysteretic comparator 170) during soft-start of the power supply circuit 120 can limit (or eliminate) undesirable behaviors (e.g., current surges, voltage spikes) that could result in reliability issues for the power supply circuit 120 and/or load circuit 136, malfunctions in the power supply circuit 120 and/or load circuit 136, undesirable behaviors (such as unnecessary under-voltage lock-out (UVLO)) of the load circuit 136, and/or so forth. In some embodiments, the power supply circuit 120 can be produced using typical (rather than specialized) semiconductor devices (e.g., resistors, capacitors, metal-oxide-semiconductor field effect transistor (MOSFET) devices, diodes).

As shown in FIG. 1, the feedback voltage 18 can be produced by the feedback circuit 180 based on the output voltage 16. In some embodiments, the feedback circuit 180 can be, for example, a voltage divider or other type of circuit. In such embodiments, the feedback voltage 18 may not be equal to (or substantially equal to) the output voltage 16. In some embodiments, the output voltage 16 can be directly used as the feedback voltage 18, and the feedback circuit 180 optionally may not be included. In such embodiment, the feedback circuit 180 may be a wire, or may be a signal path-through block.

In some embodiments, the power supply circuit 120 can be, or can include, for example, any type of switch regulator that includes a switch circuit within the power stage 124. In some embodiments, power supply circuit 120 can be referred to as a switched-mode power supply (SMPS). For example, power supply circuit 120 can be, or can include, a buck regulator, a boost regulator, a buck-boost regulator, and/or so forth.

Although not shown, an output stage (e.g., an output stage including inductors and/or capacitors), a control circuit, and/or so forth, may be operably coupled to, or included in the power stage 124 shown in FIG. 1. For example, the power stage 124 can include any type of control circuitry configured to produce a control signal that can trigger switching of a switch circuit within the power stage 124. For example, the control circuit of the power stage 124 can include a signal generator configured to produce a control signal that has a square-wave waveform (e.g., a square-wave waveform with rising and falling edges). As another example, an output stage can include any circuitry that can be used in a specific implementation of the power stage 124. For example, the output stage can include various types of circuitry for the power stage 124 including, for example, one or more capacitors, inductors, transformers, transistors, resistors, feedback circuits, and/or so forth. In some embodiments, the hysteretic comparator 170 can be included within a control circuit of the power stage 124.

The power source 150 can be any kind of power source. For example, the power source 150 can be a direct current (DC) power source such as a battery, a fuel cell, and/or so forth. Although not shown in FIG. 1, additional portions of the power supply circuit 120 (in addition to the power stage 124) may be powered by the power source 150. For example, the reference voltage circuit 140, the hysteresis control circuit 160, and/or the hysteretic comparator 170 may be powered by the power source 150.

FIGS. 2A through 2D are graphs that collectively illustrate operation of at least some portions of a power supply circuit, according to an embodiment. In some embodiments, the power supply circuit can be similar to, or the same as, the power supply circuit 120 shown in FIG. 1. As shown in FIGS. 2A through 2D, time is increasing to the right.

Although the behavior of portions of the power supply circuit are described in connection with FIGS. 2A through 2D as making transitions at specified times, voltages, and so forth, when implemented (e.g., implemented using MOSFET devices), the transitions of the components may occur slightly before or slightly after the specified voltages and/or specified times. Specifically, variations in threshold voltages, processing variations, temperature variations, switching times of devices, circuit transition delays, and/or so forth can result in conditions (e.g., non-ideal conditions) that can trigger transitions of components of the power supply circuit slightly before or slightly after the specified voltages and/or times. Also, some relatively minor non-idealities such as noise (e.g., switching noise), drift, and/or so forth, are not depicted in these graphs.

Figure 2A:
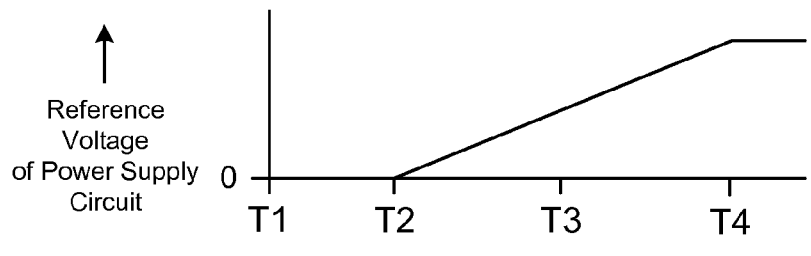
FIGS. 2A through 2D are graphs that collectively illustrate operation of at least some portions of a power supply circuit, according to an embodiment.

FIG. 2A is a graph that illustrates a reference voltage of a power supply circuit. In some embodiments, the reference voltage shown in FIG. 2A can be a reference voltage produced by a reference voltage circuit (e.g., reference voltage circuit 140 shown in FIG. 1). The power supply circuit can be configured to manage (e.g., control, regulate) power provided to a load circuit (e.g., load circuit 136 shown in FIG. 1) from a power source (e.g., power source 150 shown in FIG. 1). Between times T1 and T2 the power supply circuit is in a deactivated or non-operational state (without power). Accordingly, the reference voltage is zero.

As shown in FIG. 2A, a soft-start (e.g., soft-start process) of the power supply circuit is initiated starting at time T2 and proceeds beyond time T3. In some embodiments, the soft-start of the power supply circuit can be performed by a soft-start circuit (e.g., soft-start circuit 142 shown in FIG. 1) associated with a reference voltage circuit. In this embodiment, the soft-start of a power supply circuit is initiated as the reference voltage increases from zero starting at time T2 in a linear fashion and a monotonically increasing fashion. In some embodiments, the reference voltage during a soft-start of the power supply circuit can be referred to as a soft-start reference voltage.

In some embodiments, the soft-start of the power supply circuit can be performed by a reference voltage increasing in a nonlinear fashion. For example, soft-start circuit of the power supply circuit can be configured to monotonically increase the reference voltage at a low rate when the reference voltage is low (e.g., below a threshold voltage) and monotonically increase the reference voltage at a faster rate when the reference voltage is relatively high (e.g., exceeds the threshold voltage), or vice versa. In some embodiments, the soft-start of the power supply circuit can be performed by a reference voltage that is not monotonically increasing.

Figure 2B:
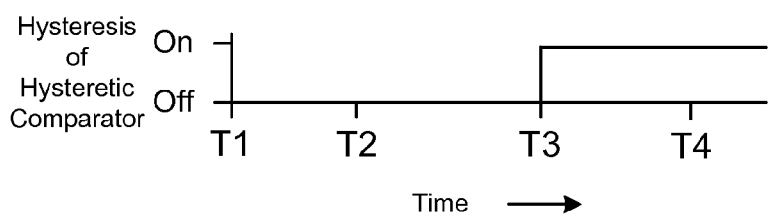

FIG. 2B is a diagram that illustrates a hysteresis of a hysteretic comparator included in the power supply circuit. The hysteretic comparator can be similar to, or the same as, the hysteretic comparator 170 shown in FIG. 1. The hysteresis of the hysteretic comparator can be changed by, for example, a hysteresis control circuit such as hysteresis control circuit 160 shown in FIG. 1.

As shown in FIG. 2B, the hysteresis of the hysteretic comparator is off (or in a deactivated state) between times T1 and T3. Specifically, the hysteresis of the hysteretic comparator is off (or e.g., deactivated by a hysteresis control circuit) as the reference voltage ramps up during soft-start of the power supply circuit.

Figure 2C:
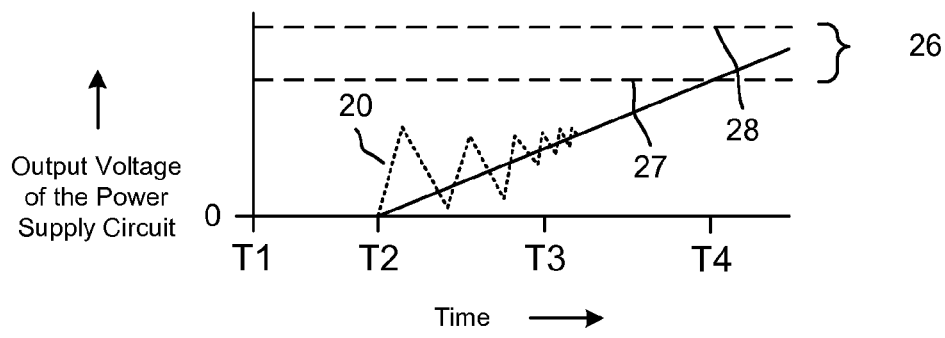

In response to the reference voltage increasing starting at time T2, an output voltage of the power supply circuit starts increasing at approximately time T2 as shown in FIG. 2C. In FIG. 2C, the output voltage of the power supply circuit increases proportional to, or at approximately the same rate as, the increase in the reference voltage. In some embodiments, the output voltage of the power supply circuit may increase at a rate that is different than a rate of increase of the reference voltage.

Figure 2D:
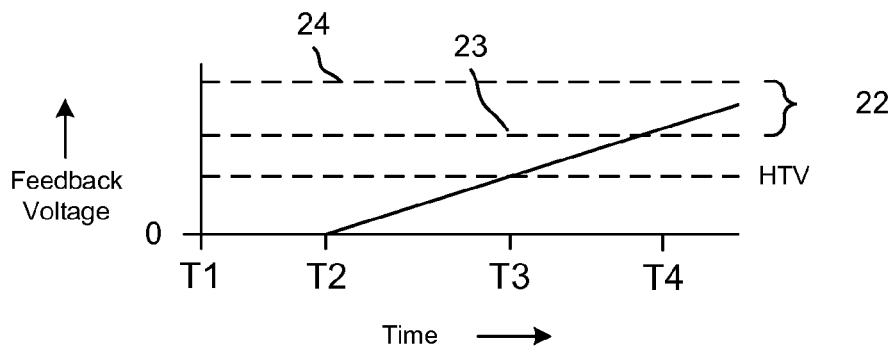

FIG. 2D illustrates a feedback voltage based on the output voltage shown in FIG. 2C. In this embodiment, the feedback voltage shown in FIG. 2D is equal to the output voltage shown in FIG. 2C. In some embodiments, the feedback voltage may be different than the output voltage shown in FIG. 2C. For example, the feedback voltage can be produced using a feedback circuit, which includes a voltage divider, based on the output voltage. In in such embodiments, the feedback voltage can be different than the output voltage.

In this embodiment, when the feedback voltage exceeds a threshold voltage HTV at approximately time T3 as shown in FIG. 2D, the hysteresis of the hysteretic comparator is turned-on at approximately time T3 as shown in FIG. 2B. As shown in FIG. 2B, the hysteresis of the hysteretic comparator is turned on in a binary fashion from the off-state (e.g., a deactivated state) to the on-state (e.g., an activated state).

As shown in FIG. 2C, the output voltage of the power supply circuit is unaffected (or substantially unaffected) by the activation of the hysteresis of the hysteretic comparator shown in FIG. 2B. The dashed line 20 illustrates overshoot of the power supply circuit when the hysteresis of the hysteretic comparator is on when the soft-start of the power supply circuit is initiated starting at time T2 (in response to the ramping reference voltage shown in FIG. 2A starting at time T2).

The graph in FIG. 2D illustrates a hysteretic voltage range 22 (also can be referred to as a hysteretic feedback voltage range) defined by a lower threshold voltage 23 and an upper threshold voltage 24. The hysteretic comparator can be configured to trigger a power stage (e.g., power stage 124 shown in FIG. 1) to provide or interrupt power from a power source (e.g., power source 150 shown in FIG. 1) to a load circuit (e.g., load circuit 136 shown in FIG. 1) based on the hysteretic voltage range 22. For example, although not shown in FIG. 2D, when the feedback voltage meets or exceeds the upper threshold voltage 24 of the hysteretic voltage range 22, the hysteretic comparator can be configured to trigger interruption (via a power stage) of power provided from a power source to a load circuit.

The graph shown in FIG. 2C illustrates an output voltage range 26 defined by a lower threshold voltage 27 and an upper threshold voltage 28. In this embodiment, the output voltage of the power supply circuit (shown in FIG. 2C) can be scaled with the feedback voltage (shown in FIG. 2D), therefore the hysteretic voltage range 22 can be scaled similarly with the output voltage range 26. In some embodiments, the hysteretic voltage range 22 (which is used by the hysteretic comparator to trigger hysteretic control) can be defined so that the output voltage range 26 has desirable limits (lower threshold voltage 27 and/or upper threshold voltages 28). When the output voltage of the power supply circuit is within the output voltage range 26 (starting at approximately time T4), the reference voltage of the power supply circuit is maintained at approximately a constant voltage.

In some embodiments, the threshold voltage HTV can be higher or lower than that shown in FIG. 2D. In many embodiments, the threshold voltage HTV is less than or equal to the lower hysteresis threshold voltage 23. In some embodiments, multiple threshold voltages (such as threshold voltage HTV) can employed for hysteresis control of multiple values as described above.

Although the hysteresis of the hysteretic comparator is activated in a binary fashion (from an off-state to an on-state) in digital hysteresis control as shown in FIG. 2B, in some embodiments, the hysteresis of the hysteretic comparator can be gradually turned on (analog hysteresis control). In other words, the hysteresis of the comparator can be increased (e.g., gradually increased) from a zero value or a nonzero value to a higher value. In some embodiments, the hysteresis of the hysteretic comparator can be turned on in a stepwise fashion. For example, the hysteresis of the hysteretic comparator can be increased (e.g., increased in a stepwise fashion) from a first value to a second value in response to a first threshold value being exceeded. The hysteresis of the hysteretic comparator can be increased (e.g., increased in a stepwise fashion) from the second value to a third value in response to a second threshold value (different from the first threshold value) being exceeded.

Although not shown in FIGS. 2A through 2D, in some embodiments, when the feedback voltage shown in FIG. 2D falls below the threshold voltage HTV, the hysteresis of the hysteretic comparator can be changed from the on-state to the off-state. In other words, the hysteresis of the hysteretic comparator can be deactivated in response to the feedback voltage falling below (or crossing) the threshold voltage HTV. In some embodiments, the hysteresis of the hysteretic comparator can be deactivated at a first threshold voltage that is different than (e.g., greater than, less than) a second threshold voltage that triggers the hysteresis of the hysteretic comparator to be activated. Although not shown in FIGS. 2A through 2D, when the soft-start process has been completed, the power supply circuit can function in a normal operational mode and the soft-start circuit may be deactivated.

Figure 3:
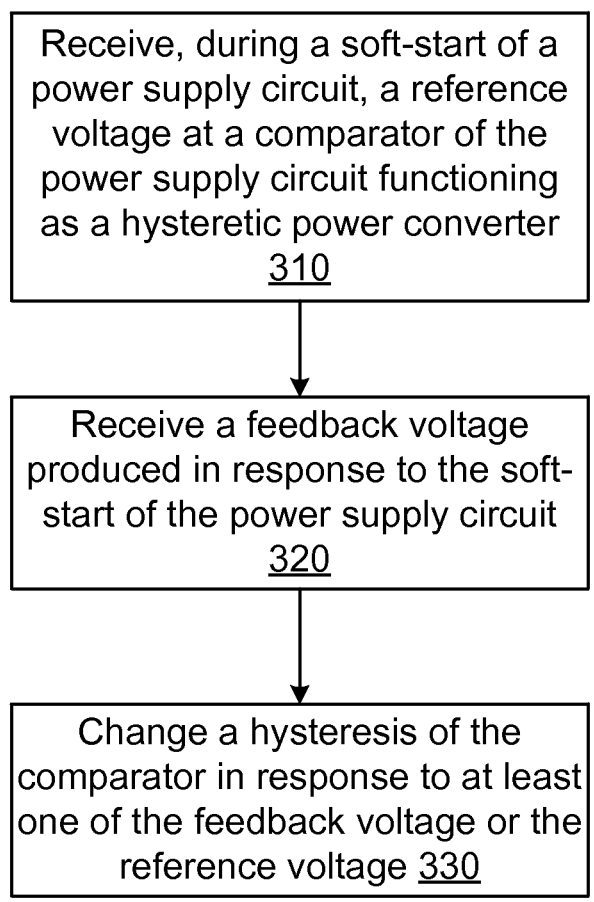
FIG. 3 is a flowchart that illustrates operation of a power supply circuit, according to an embodiment.

FIG. 3 is a flowchart that illustrates operation of a power supply circuit, according to an embodiment. In some embodiments, the power supply circuit can be a power supply circuit similar to the power supply circuit 120 shown in FIG. 1.

As shown in FIG. 3, a reference voltage is received, during a soft-start of a power supply circuit, at a comparator of the power supply circuit (block 310). In some embodiments, the reference voltage can be produced by a reference voltage circuit (e.g., reference voltage circuit 140 shown in FIG. 1). In some embodiments, the soft-start a power supply circuit can be performed in response to a soft-start reference voltage produced by a soft-start circuit (e.g., soft-start circuit 142 shown in FIG. 1) included in, or associated with, the reference voltage circuit. In some embodiments, the soft-start a power supply circuit can be performed in response to a monotonically increasing soft-start reference voltage. In some embodiments, the power supply circuit can be configured to function as a hysteretic power converter (e.g., a DC-to-DC power converter, a DC-to-DC buck converter).

A feedback voltage produced in response to the soft-start of the power supply circuit is received (block 320). The feedback voltage can be received at a hysteresis control circuit (e.g., hysteresis control circuit 160 shown in FIG. 1) and at a hysteretic comparator (e.g., hysteretic comparator 170 shown in FIG. 1). In some embodiments, the feedback voltage can be produced based on an output voltage of the power supply circuit. In some embodiments, the feedback voltage can be produced by a feedback circuit (e.g., feedback circuit 180 shown in FIG. 1) based on an output voltage produced by the power supply circuit.

A hysteresis of the comparator is changed (e.g., controlled, increased) in response to at least one of the feedback voltage (e.g., exceeding a threshold voltage) or the reference voltage (block 330). The hysteretic voltage range of the comparator can be changed (e.g., increased) by a hysteresis control circuit (e.g., hysteresis control circuit 160 shown in FIG. 1). In some embodiments, the hysteresis can be associated with a hysteretic voltage range, which can correspond with (e.g., can be equal to, can be proportional to) an output voltage range of the power supply circuit. In some embodiments, the hysteretic voltage range can be increased from a zero value, or from a nonzero value, or decreased from a nonzero value to a zero value. In some embodiments, a hysteretic voltage range associated with the hysteresis can be increased from an off-state to an on-state (in a digital (or abrupt) fashion), changed (e.g., modified) between multiple hysteretic voltage ranges in response to multiple threshold voltage, changed (e.g., modified) linearly, or nonlinearly, in an analog fashion (e.g., gradually changed).

Figure 4A:
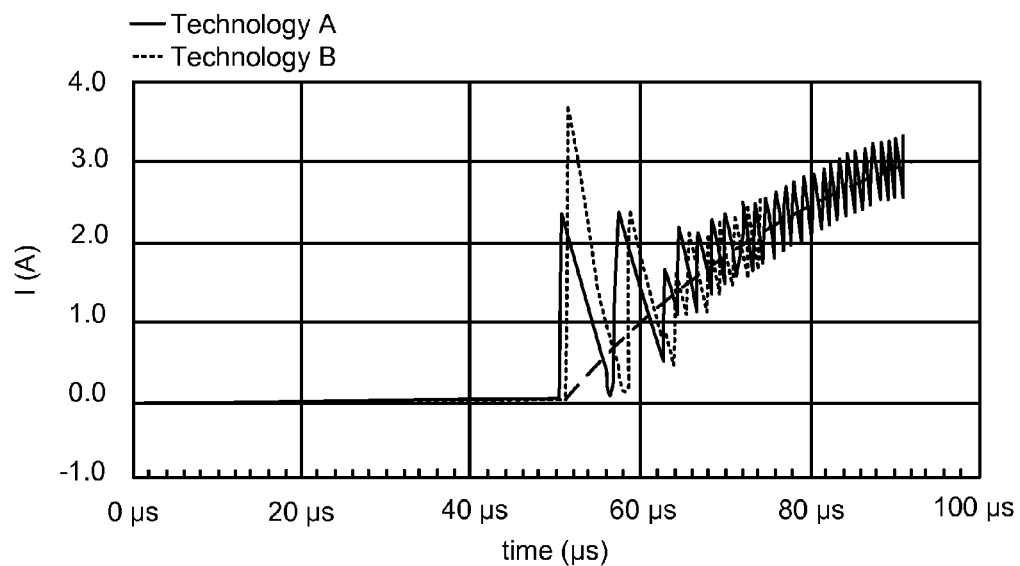
FIG. 4A is a graph that illustrates a transient response of the current from a power supply during soft-start of a power supply circuit without a hysteresis control circuit.

FIG. 4A is a graph that illustrates a transient response of the current from a power source (e.g., the power source 150 shown in FIG. 1) during soft-start of a power supply circuit (e.g., the power supply circuit 120 shown in FIG. 1) without a hysteresis control circuit. In FIG. 4A, current in amps (A) is shown on the y-axis and time in microseconds (μs) is shown on the x-axis. Soft-start of the power supply circuit is initiated at approximately 50 μs.

FIG. 4A illustrates a surge in current greater than 2 A for a configuration of a power supply circuit produced using process technology A and a surge in current of nearly 4 A for the configuration of the power supply circuit produced using process technology B shortly after that the initiation of the soft-start of the power supply circuit (assuming a target along approximately the dashed line). Also as shown in FIG. 4A, the current fluctuates several amps during the soft-start process. For example, in technology B, after the current increases to nearly 4 A in response to the initiation of the soft-start process, the current drops to nearly 0 A at approximately 58 μs.

Figure 4B:
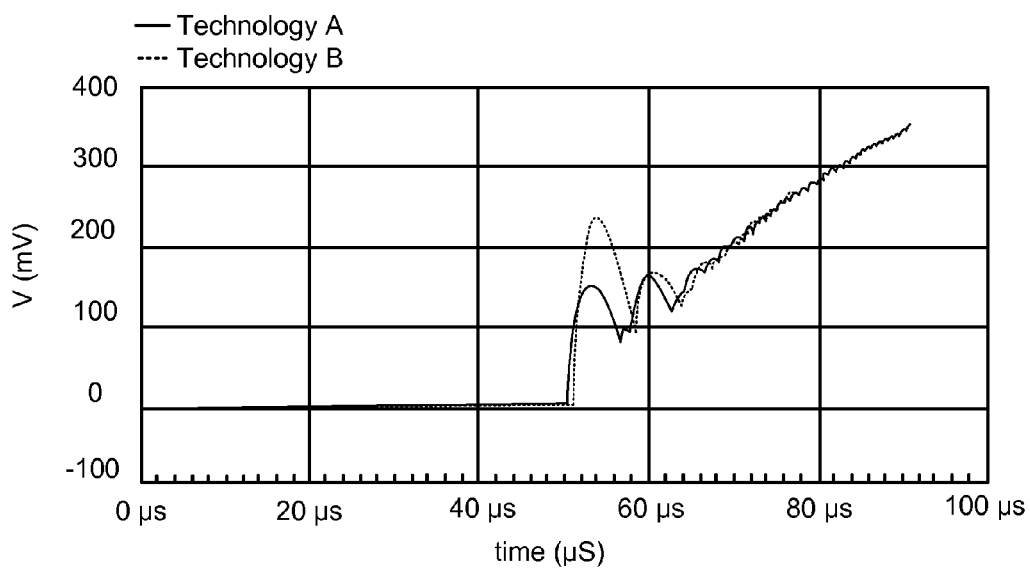
FIG. 4B is a graph that illustrates a transient response of the output voltage to a load circuit during soft-start of a power supply circuit without a hysteresis control circuit.

FIG. 4B is a graph that illustrates a transient response of the output voltage of a power supply circuit (e.g., the power supply circuit 120 shown in FIG. 1) to a load circuit during soft-start of the power supply circuit without a hysteresis control circuit. The voltages correspond with the currents shown in FIG. 4A. In FIG. 4B, voltage in millivolts (mV) is shown on the y-axis and time in microseconds (μs) is shown on the x-axis.

FIG. 4B illustrates a voltage overshoot of approximately 100 mV for the power supply circuit in process technology A and an overshoot in voltage of approximately 200 mV for the power supply circuit in process technology B in response to the initiation of the soft-start of the power supply circuit at 50 μs (assuming a target along approximately the dashed line). Also as shown in FIG. 4B, the voltage continues to fluctuate for several microseconds during the soft-start process. In some embodiments, the abrupt change from a relatively high voltage to a relatively low voltage as shown in FIG. 4B can erroneously trigger activation of an under-voltage lock-out (UVLO) circuit in a load circuit.

Figure 5A:
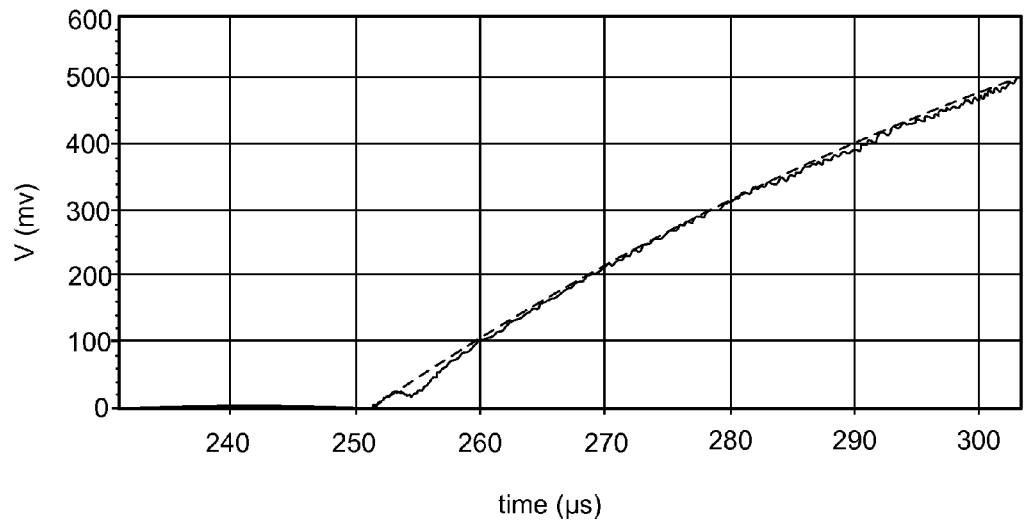
FIG. 5A is a diagram that illustrates a transient response of the output voltage to a load circuit during soft-start of a power supply circuit with a hysteresis control circuit.

FIG. 5A is a diagram that illustrates a transient response of the output voltage of a power supply circuit (e.g., the power supply circuit 120 shown in FIG. 1) to a load circuit during soft-start of the power supply circuit with a hysteresis control circuit. In FIG. 5A, voltage in millivolts (mV) is shown on the y-axis and time in microseconds (μs) is shown on the x-axis. Soft-start of the power supply circuit is initiated at approximately 251 μs. FIG. 5A illustrates almost no voltage overshoot (assuming a target along approximately the dashed line) in response to the initiation of the soft-start the power supply circuit.

Figure 5B:
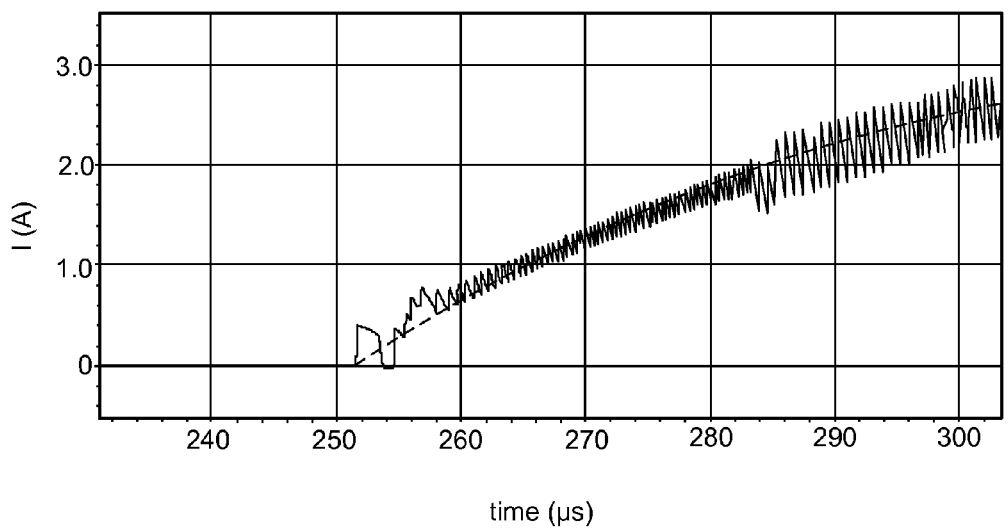
FIG. 5B is a diagram that illustrates a transient response of the current from a power source during soft-start of a power supply circuit with a hysteresis control circuit.

FIG. 5B is a diagram that illustrates a transient response of the current from a power source (e.g., the power source 150 shown in FIG. 1) during soft-start of a power supply circuit (e.g., the power supply circuit 120 shown in FIG. 1) with a hysteresis control circuit. The current corresponds with the voltage shown in FIG. 5A. In FIG. 5B, current in amps (A) is shown on the y-axis and time in microseconds (μs) is shown on the x-axis. FIG. 5B illustrates relatively small current surges (assuming a target along approximately the dashed line) in response to the initiation of the soft-start process. For example, the initial current surge is less than 0.5 A shown in FIG. 5B in comparison to the 2 A or nearly 4 A shown in FIG. 4A.

Implementations of the various techniques described herein may be implemented in digital electronic circuitry, or in computer hardware, firmware, software, or in combinations of them. Portions of methods may be performed by, and an apparatus (e.g., the input power protection device, the power management device) may be implemented within, special purpose logic circuitry, e.g., an FPGA (field programmable gate array) or an ASIC (application-specific integrated circuit).

Some implementations may include various semiconductor processing and/or packaging techniques. Some embodiments may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that appended claims, when included, are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A power supply circuit, comprising: a power stage configured to be coupled to a power source and configured to deliver an output voltage to a load circuit; a comparator coupled to the power stage and configured to receive a reference voltage; and a hysteresis control circuit configured to receive a feedback voltage based on the output voltage, the hysteresis control circuit configured to change a hysteresis of the comparator, from an off-state to an on-state, in response to a comparison of the feedback voltage with a threshold voltage during a soft-start of the power supply circuit, the change being implemented during the soft-start of the power supply circuit and before normal operation of the power supply circuit, the comparator being operational while the hysteresis of the comparator is in the off-state.

2. The power supply circuit of claim 1, further comprising:
    a soft-start circuit configured to produce a soft-start reference voltage, the soft-start of the power supply circuit being performed based on the soft-start reference voltage.

3. The power supply circuit of claim 1, wherein the power supply circuit is configured to function as a hysteretic converter.

4. The power supply circuit of claim 1, wherein the hysteresis is changed based on a hysteretic voltage range associated with the comparator.

5. The power supply circuit of claim 1, wherein the hysteresis of the comparator is changed in response to the feedback voltage exceeding the threshold voltage.

6. The power supply circuit of claim 1, wherein the power supply circuit is configured to provide power within an output voltage range.

7. The power supply circuit of claim 1, wherein the threshold voltage is a first threshold voltage, the hysteresis of the comparator is changed in response to the feedback voltage exceeding the first threshold voltage,
    the power supply circuit is a hysteretic converter configured to provide power from the power source to the load circuit when the feedback voltage falls below a second threshold voltage and configured to interrupt power to the load circuit when the feedback voltage exceeds a third threshold voltage.

8. The power supply circuit of claim 1, wherein the hysteresis of the comparator is changed in response to the feedback voltage exceeding the threshold voltage at a voltage lower than voltage limits of a hysteretic voltage range of the comparator during normal operation of the power supply circuit.

9. The power supply circuit of claim 1, wherein the hysteresis control circuit is configured to change the hysteresis of the comparator in a binary fashion.

10. A power supply circuit, comprising: a reference voltage circuit configured to trigger a soft-start of the power supply circuit; a comparator coupled to the reference voltage circuit; and a hysteresis control circuit configured to receive a feedback voltage, the hysteresis control circuit configured to change a hysteresis of the comparator from an off-state at a first time during the soft-start of the power supply circuit to an on-state at a second time during the soft-start of the power supply circuit, the change being in response to a comparison of the feedback voltage with a threshold voltage during the soft-start of the power supply circuit, the comparator being operational while the hysteresis of the comparator is in the off-state.

11. The power supply circuit of claim 10, wherein the hysteresis is configured to trigger the power supply circuit to control an output voltage of the power supply circuit within an output voltage range bounded by an upper threshold voltage and a lower threshold voltage.

12. The power supply circuit of claim 10, wherein the hysteresis control circuit is configured to increase the hysteresis of the comparator.

13. The power supply circuit of claim 10, further comprising:
a power stage configured to be coupled to a power source and configured to deliver an output voltage to a load circuit.

14. The power supply circuit of claim 10, wherein the power supply circuit is configured to control an output voltage of the power supply circuit within an output voltage range bounded by an upper voltage and a lower voltage, the threshold voltage is at a voltage below the output voltage range.

15. The power supply circuit of claim 10, wherein the hysteresis of the comparator is changed in response to the reference voltage ramping up during the soft-start of the power supply circuit.

16. A method, comprising: receiving, during a soft-start of a power supply circuit, a reference voltage at a comparator of the power supply circuit; receiving, at a control circuit, a feedback voltage produced in response to the soft-start of the power supply circuit; comparing, at the control circuit, the feedback voltage with a threshold voltage; and changing, in response to the comparing and during the soft-start of the power supply circuit, a hysteresis of the comparator from an off-state to an on-state, the comparator being operational while the hysteresis of the comparator is in the off-state, the hysteresis of the comparator being in the on-state during normal operation of the power supply circuit.

17. The method of claim 16, wherein the changing includes increasing a hysteretic voltage range associated with the hysteresis of the comparator.

18. The method of claim 16, wherein the changing includes changing the hysteresis of the comparator in response to the reference voltage ramping up during the soft-start of the power supply circuit.

19. The method of claim 16, wherein the reference voltage is a monotonically increasing voltage.

20. The method of claim 16, wherein the power supply circuit is configured to function as a hysteretic power converter.

21. The method of claim 16, further comprising:
producing an output voltage of the power supply circuit within an output voltage range bounded by an upper threshold voltage and a lower threshold voltage based on the hysteresis of the comparator after the soft-start of the power supply circuit has been performed, the output voltage range being different from a hysteretic voltage range of the hysteresis.

* * * * *